United States Patent
Akita et al.

(10) Patent No.: US 9,755,557 B2
(45) Date of Patent: Sep. 5, 2017

(54) FIELD-WINDING ROTATING ELECTRICAL MACHINE

(71) Applicants: Kenichi Akita, Chiyoda-ku (JP); Masato Mori, Chiyoda-ku (JP); Mitsunori Tabata, Chiyoda-ku (JP)

(72) Inventors: Kenichi Akita, Chiyoda-ku (JP); Masato Mori, Chiyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 14/394,637

(22) PCT Filed: Sep. 19, 2012

(86) PCT No.: PCT/JP2012/073892
§ 371 (c)(1),
(2) Date: Oct. 15, 2014

(87) PCT Pub. No.: WO2014/045348
PCT Pub. Date: Mar. 27, 2014

(65) Prior Publication Data
US 2015/0091534 A1 Apr. 2, 2015

(51) Int. Cl.
*H02P 9/10* (2006.01)
*H02P 9/14* (2006.01)
(Continued)

(52) U.S. Cl.
CPC ............... *H02P 9/48* (2013.01); *B60L 15/02* (2013.01); *H02P 9/14* (2013.01); *H02P 29/664* (2016.11);
(Continued)

(58) Field of Classification Search
CPC .. H02P 9/14; H02P 9/48; H02P 29/664; B60L 15/02
(Continued)

(56) References Cited

U.S. PATENT DOCUMENTS 5,099,189 A  3/1992  Iwaki et al.
6,803,748 B2 * 10/2004  Peter ...................... H02H 7/067
322/17

(Continued)

FOREIGN PATENT DOCUMENTS

JP   59-126600 U   8/1984
JP   63-88044 U    6/1988
(Continued)

OTHER PUBLICATIONS

Machine Translation of JP 2012-100473, which was cited in the IDS filed on Oct. 15, 2014.
(Continued)

*Primary Examiner* — Tulsidas C Patel
*Assistant Examiner* — Thomas Quigley
(74) *Attorney, Agent, or Firm* — Sughrue Mion, PLLC; Richard C. Turner

(57) ABSTRACT

A field current limiting section includes a field current limitation instructing section for, when a field current limitation determining section determines that a determination value has reached a predetermined determination threshold value, generating a field current limiting instruction to a field current control section so as to limit field current to be equal to or smaller than a predetermined permissible value during a predetermined field current limitation time $T_{lim}$. A field current limitation releasing section outputs a field current limitation releasing instruction to the field current limiting section so as to release limitation of the field current during a predetermined field current limitation release time $T_C$.
(Continued)

When having received the field current limitation releasing instruction from the field current limitation releasing section, the field current limiting section releases limitation of the field current during the predetermined field current limitation release time.

6 Claims, 6 Drawing Sheets

(51) Int. Cl.
*H02P 9/48* (2006.01)
*B60L 15/02* (2006.01)
*H02P 29/66* (2016.01)

(52) U.S. Cl.
CPC ... *B60L 2240/425* (2013.01); *B60L 2240/429* (2013.01); *B60L 2240/80* (2013.01); *Y02T 10/645* (2013.01)

(58) Field of Classification Search
USPC .................................. 322/24, 26, 28, 44, 59
See application file for complete search history.

(56) References Cited

U.S. PATENT DOCUMENTS

| | | | |
|---|---|---|---|
| 2004/0150233 A1* | 8/2004 | Kajiura | F02N 11/04 290/24 |
| 2010/0301816 A1* | 12/2010 | Akita | H02P 29/0077 322/34 |
| 2012/0112709 A1* | 5/2012 | Akita | H02P 9/30 322/34 |

FOREIGN PATENT DOCUMENTS

| | | |
|---|---|---|
| JP | 08-009567 A | 1/1996 |
| JP | 2010-279085 A | 12/2010 |
| JP | 2012-100473 A | 5/2012 |

OTHER PUBLICATIONS

Communication dated Jun. 23, 2015 from the Japanese Patent Office in counterpart application No. 2014-536440.
International Search Report for PCT/JP2012/073892, dated Dec. 18, 2012.

* cited by examiner

FIELD-WINDING ROTATING ELECTRICAL MACHINE

CROSS REFERENCE TO RELATED APPLICATIONS

This application is a National Stage of International Application No. PCT/JP2012/073892, filed Sep. 19, 2012, the contents of all of which are incorporated herein by reference in their entirety.

TECHNICAL FIELD

The present invention relates to a field-winding rotating electrical machine provided mainly in a vehicle and having a control device.

BACKGROUND ART

Generally, a rotating electrical machine for vehicle is provided in an engine room. Therefore, the rotating electrical machine for vehicle in use has an extremely high temperature. The internal temperature of the rotating electrical machine for vehicle further increases due to heat generated when the rotating electrical machine for vehicle performs an operation such as power generation or driving. Therefore, when the temperature of the rotating electrical machine for vehicle excessively increases due to continuous operation for a long time, failure due to breakage of internal components may occur in the rotating electrical machine for vehicle.

Considering the above, in a conventional output control method or output control device for an AC power generator for vehicle, as means for preventing failure of the AC power generator for vehicle due to temperature increase, a method is proposed in which the temperature of the AC power generator or the ambient temperature is measured, and when it is detected that the temperature exceeds a predetermined abnormal temperature value, AC power generator output current is limited to reduce thermal load on a control device (for example, see Patent Document 1).

However, the output control method and the output control device of the AC power generator for vehicle described in Patent Document 1 detect the temperature of the AC power generator for vehicle by a temperature sensor and limit field current, thereby protecting the AC power generator for vehicle from temperature increase. Therefore, it is necessary to provide a temperature sensor, thus causing a problem that the cost of the AC power generator for vehicle increases and the configuration thereof needs to be changed.

Considering the above, in Patent Document 2, if field current flowing in a field winding has continued to be equal to or greater than a predetermined threshold value during a predetermined time, the applied field current is limited within a range that does not cause breakage due to heat generation, thus preventing excessive temperature increase.

CITATION LIST

Patent Document

Patent Document 1: Japanese Laid-Open Patent Publication No. 8-9567
Patent Document 2: Japanese Laid-Open Patent Publication No. 2010-279085

SUMMARY OF THE INVENTION

Problems to be Solved by the Invention

However, when the field current is limited as compared to a normal state, the same output as in the normal state cannot be obtained. Therefore, for example, in a rotating electrical machine provided for engine starting, if field current is limited when an engine is restarted from an idling stop state, desired output needed for engine starting cannot be obtained, and therefore the restart of the engine fails, and this may significantly influence the behavior of a vehicle.

The present invention has been made to solve the above problem, and an object of the present invention is to provide a field-winding rotating electrical machine that can suppress temperature increase by limiting field current flowing in a field winding without need of a temperature sensor, and in a situation such as restart of an engine in which the behavior of a vehicle can be greatly influenced and therefore output in a normal state is needed, can obtain output in the normal state as much as possible.

Solution to the Problems

A field-winding rotating electrical machine according to the present invention includes: a motor generator having a field winding; a field current detecting section for detecting field current flowing in the field winding; a field current control section for controlling the field current; a field current limiting section including a field current limitation determining section for calculating a determination value based on the field current detected by the field current detecting section and determining whether or not the determination value has reached a predetermined determination threshold value, and a field current limitation instructing section for, when the field current limitation determining section determines that the determination value has reached the predetermined determination threshold value, generating a field current limiting instruction to the field current control section so as to limit the field current to be equal to or smaller than a predetermined permissible value during a predetermined field current limitation time; and a field current limitation releasing section for outputting a field current limitation releasing instruction to the field current limiting section so as to release limitation of the field current during a predetermined field current limitation release time, wherein the field current limiting section, when having received the field current limitation releasing instruction from the field current limitation releasing section, releases limitation of the field current during the predetermined field current limitation release time.

Effect of the Invention

According to the present invention, it becomes possible to obtain a field-winding rotating electrical machine that, while monitoring field current flowing in a field winding, can limit the field current so that the temperature of the field-winding rotating electrical machine does not excessively increase, and even when the field current is limited, if a vehicle needs a normal output, can release the limitation of field current within a predetermined range of time.

DESCRIPTION OF EMBODIMENTS

Embodiment 1

Hereinafter, a field-winding rotating electrical machine according to embodiment 1 of the present invention will be described with reference to FIG. 1 to FIG. 6.

Figure 1:
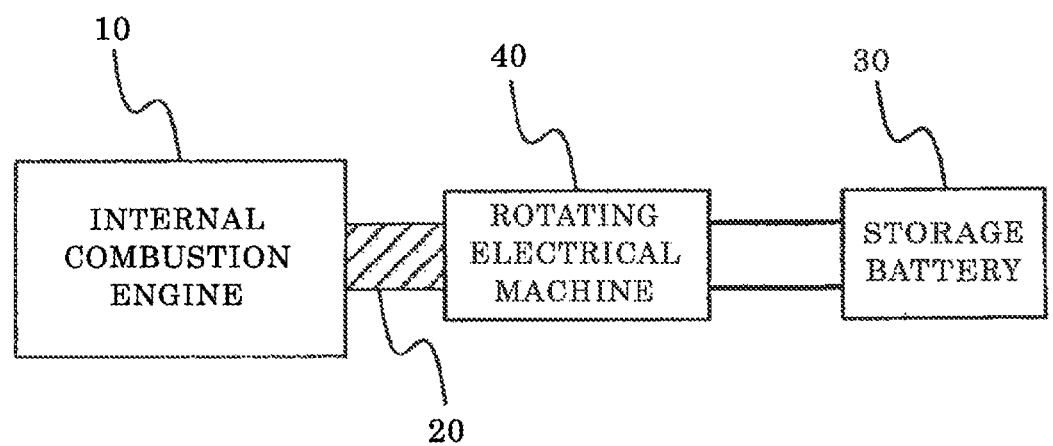
FIG. 1 is a schematic configuration diagram in the case where a field-winding rotating electrical machine according to embodiment 1 of the present invention is provided in a vehicle.

FIG. 1 is a schematic configuration diagram showing the case where the field-winding rotating electrical machine according to embodiment 1 is provided in a vehicle. As shown in FIG. 1, a field-winding rotating electrical machine 40 is connected to an internal combustion engine 10 via connection means 20 such as a belt or a pulley. In addition, a storage battery 30 is electrically connected to the field-winding rotating electrical machine 40.

The field-winding rotating electrical machine 40 may be directly connected to the internal combustion engine 10 not via the connection means 20. Further, the internal combustion engine 10 is not limited to either a gasoline engine or a diesel engine. In addition, the storage battery 30 may be dedicated for the field-winding rotating electrical machine 40 or may be shared with a load for vehicle other than the field-winding rotating electrical machine 40.

Figure 2:
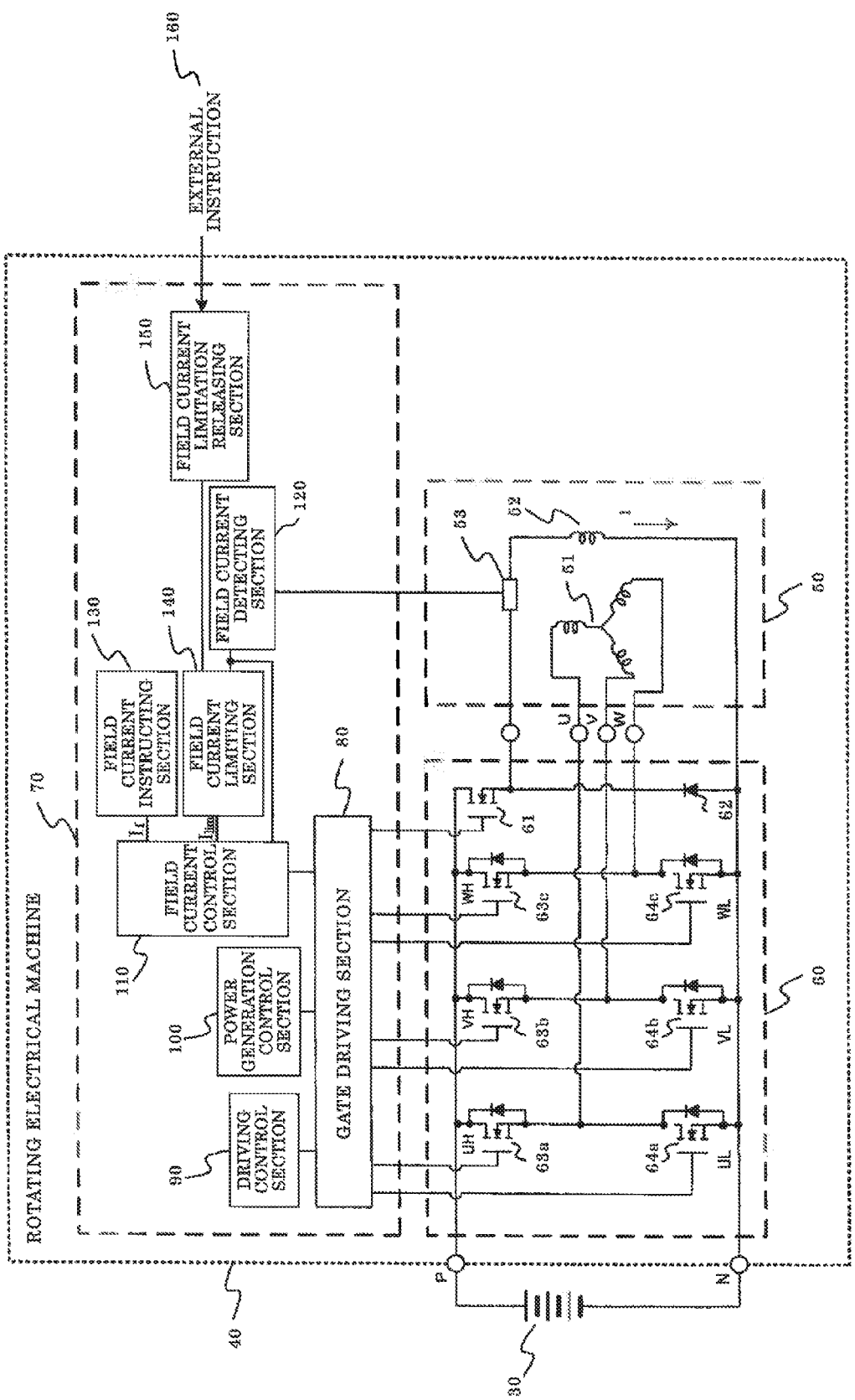
FIG. 2 is a configuration diagram of the field-winding rotating electrical machine of embodiment 1 of the present invention.

FIG. 2 is a configuration diagram of the field-winding rotating electrical machine.

As shown in FIG. 2, the field-winding rotating electrical machine is roughly composed of three parts. These parts are a motor generator 50, a power conversion section 60, and a control section 70. The storage battery 30 is connected to the power conversion section 60, and thus the power conversion section 60 is supplied with power from outside.

The motor generator 50 includes a three-phase armature winding 51 in a Y-connection form or a Δ-connection form, a field winding 52, and a current detector 53. The motor generator 50 may use an armature winding other than a three-phase type.

The motor generator 50 has operation modes of stop, power generation, and driving, which are shifted in accordance with an external instruction 160 which is an operation instruction from outside.

The power conversion section 60 is a three-phase inverter, and includes a switching element 61 for field winding current connected to the field winding 52, a flywheel diode 62, and switching elements 63a to 63c and 64a to 64c for power conversion connected to the respective phases of the armature winding 51.

The control section 70 includes a gate driving section 80, a driving control section 90, a power generation control section 100, a field current control section 110, a field current detecting section 120, a field current instructing section 130, a field current limiting section 140, and a field current limitation releasing section 150.

The gate driving section 80 drives the switching element 61 for field winding current and the switching elements 63a to 63c and 64a to 64c for power conversion, based on ON/OFF instructions for the armature winding 51 and the field winding 52 which are sent from the driving control section 90, the power generation control section 100, and the field current control section 110, thereby performing driving control or power generation control for the motor generator 50.

The driving control section 90 controls ON/OFF timings of the switching elements 63a to 63c and 64a to 64c for power conversion, when the motor generator 50 is driven.

The power generation control section 100 controls ON/OFF timings of the switching elements 63a to 63c and 64a to 64c for power conversion, to perform synchronous rectification when the motor generator 50 generates power.

The field current detecting section 120 detects field current I flowing in the field winding 52 by the current detector 53. The field current instructing section 130 transmits a field current instruction value $I_f$ for the field current I as a control target, to the field current control section 110.

The field current limiting section 140 determines whether or not to limit the field current I based on the field current I detected by the field current detecting section 120. As a result, if it is determined that the field current I needs to be limited, the field current limiting section 140 transmits a field current limitation value $I_{lim}$ to the field current control section 110.

The field current limitation releasing section 150 instructs the field current limiting section 140 to release limitation of the field current I based on an operation instruction for stop, power generation, or driving from the external instruction 160.

Here, when having received the field current limitation value $I_{lim}$ from the field current limiting section 140, the field current control section 110 transmits, to the gate driving section 80, a signal for controlling the field current I to be flown in the field winding 52, using the field current limitation value $I_{lim}$ as a control target value.

In the case where the field current instruction value $I_f$ is smaller than the field current limitation value $I_{lim}$, that is, in the case where a relationship of field current instruction value $I_f$<field current limitation value $I_{lim}$ is satisfied, the field current control section 110 transmits a signal for controlling the field current I to be the field current instruction value $I_f$.

In the case where the field current control section 110 has not received the field current limitation value $I_{lim}$ from the field current limiting section 140, the field current control section 110 always transmits a signal for controlling the field current I to be flown in the field winding 52, based on the field current instruction value $I_f$.

Figure 3:
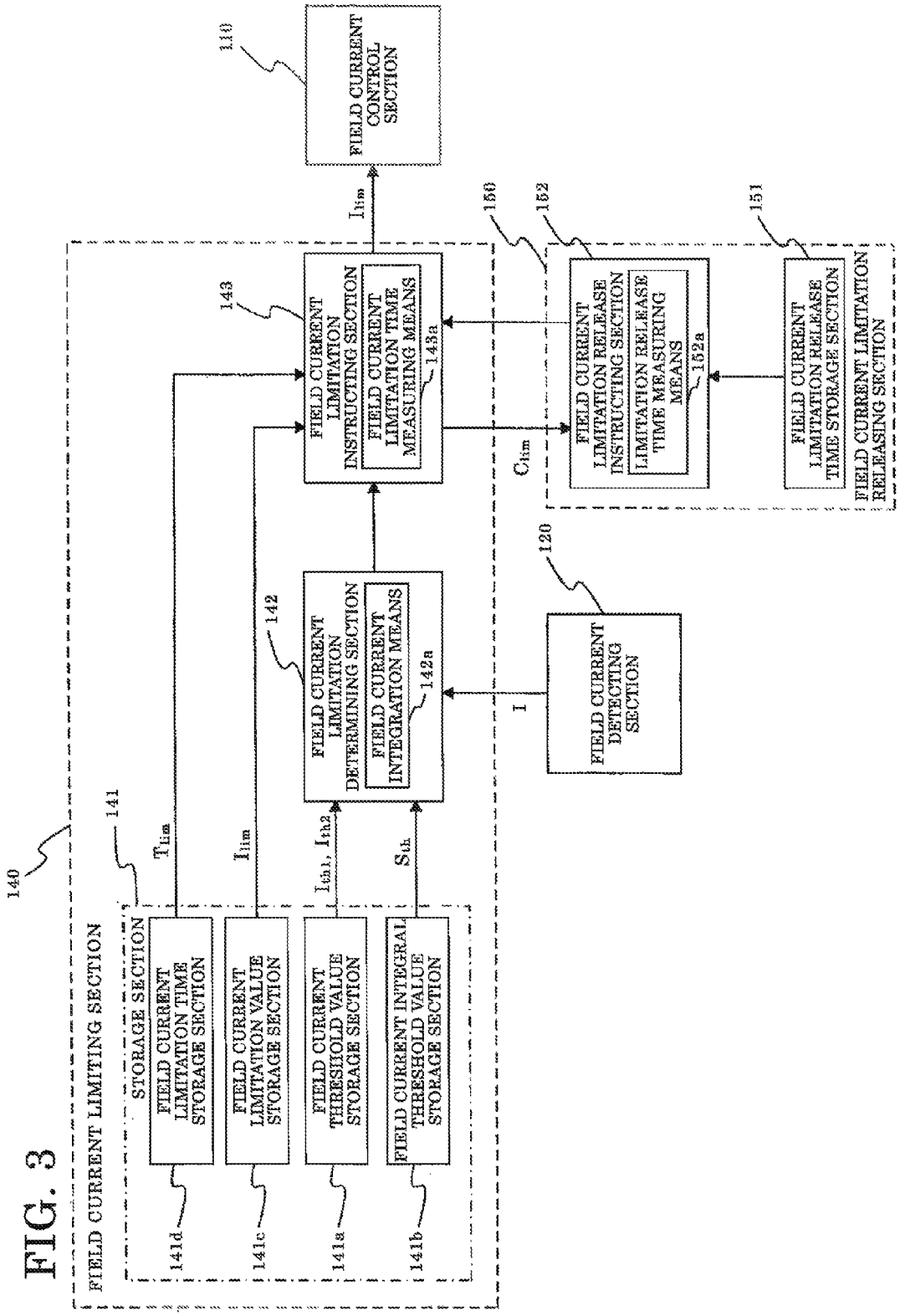
FIG. 3 is a configuration diagram of a field current limiting section and a field current limitation releasing section in FIG. 2 of embodiment 1 of the present invention.

FIG. 3 is a configuration diagram of the field current limiting section 140 and the field current limitation releasing section 150 of the field-winding rotating electrical machine.

The field current limiting section 140 includes a storage section 141, a field current limitation determining section 142, and a field current limitation instructing section 143. The storage section 141 includes a field current threshold value storage section 141a, a field current integral threshold value storage section 141b, a field current limitation value storage section 141c, and a field current limitation time storage section 141d.

In addition, the field current limitation determining section 142 has field current integration means 142a. The field current limitation instructing section 143 has field current limitation time measuring means 143a.

Here, in the field current threshold value storage section 141a, a first field current threshold value $I_{th1}$ and a second field current threshold value $I_{th2}$ that is set to be smaller than the first field current threshold value $I_{th1}$ are stored in advance. That is, the first and second field current threshold values $I_{th1}$ and $I_{th2}$ have a relationship of first field current threshold value $I_{th1}$>second field current threshold value $I_{th2}$.

The field current limitation determining section 142 is connected to the field current integral threshold value storage section 141b, and a field current integral threshold value $S_{th}$ is stored in advance in the field current integral threshold value storage section 141b.

In the field current limitation value storage section 141c, the field current limitation value $I_{lim}$ is stored in advance. In the field current limitation time storage section 141d, a field current limitation time $T_{lim}$ for the field current I is stored in advance.

The field current limitation releasing section 150 includes a field current limitation release time storage section 151 and a field current limitation release instructing section 152. The field current limitation release instructing section 152 has field current limitation release time measuring means 152a.

In the field current limitation release time storage section 151, a field current limitation release time $T_C$ is stored in advance, which is set in accordance with a time that has elapsed since the field current limiting section 140 has started limiting the field current I.

The field current limitation release time $T_C$ is set to be equal to or shorter than a time during which, after the field current I has been limited during the limitation elapsed time, operation can be performed without limitation from that state, that is, failure due to excessive heat does not occur. Since the field current limitation release time $T_C$ is set in accordance with the elapsed time from start of limitation of the field current I, the longer the elapsed time from the start of limitation is, the longer the release time can be set to be.

Next, the details of operation of the field-winding rotating electrical machine will be described with reference to FIGS. 4 to 6.

First, operation of the field current limitation determining section 142 will be described with reference to FIG. 4.

Figure 4:
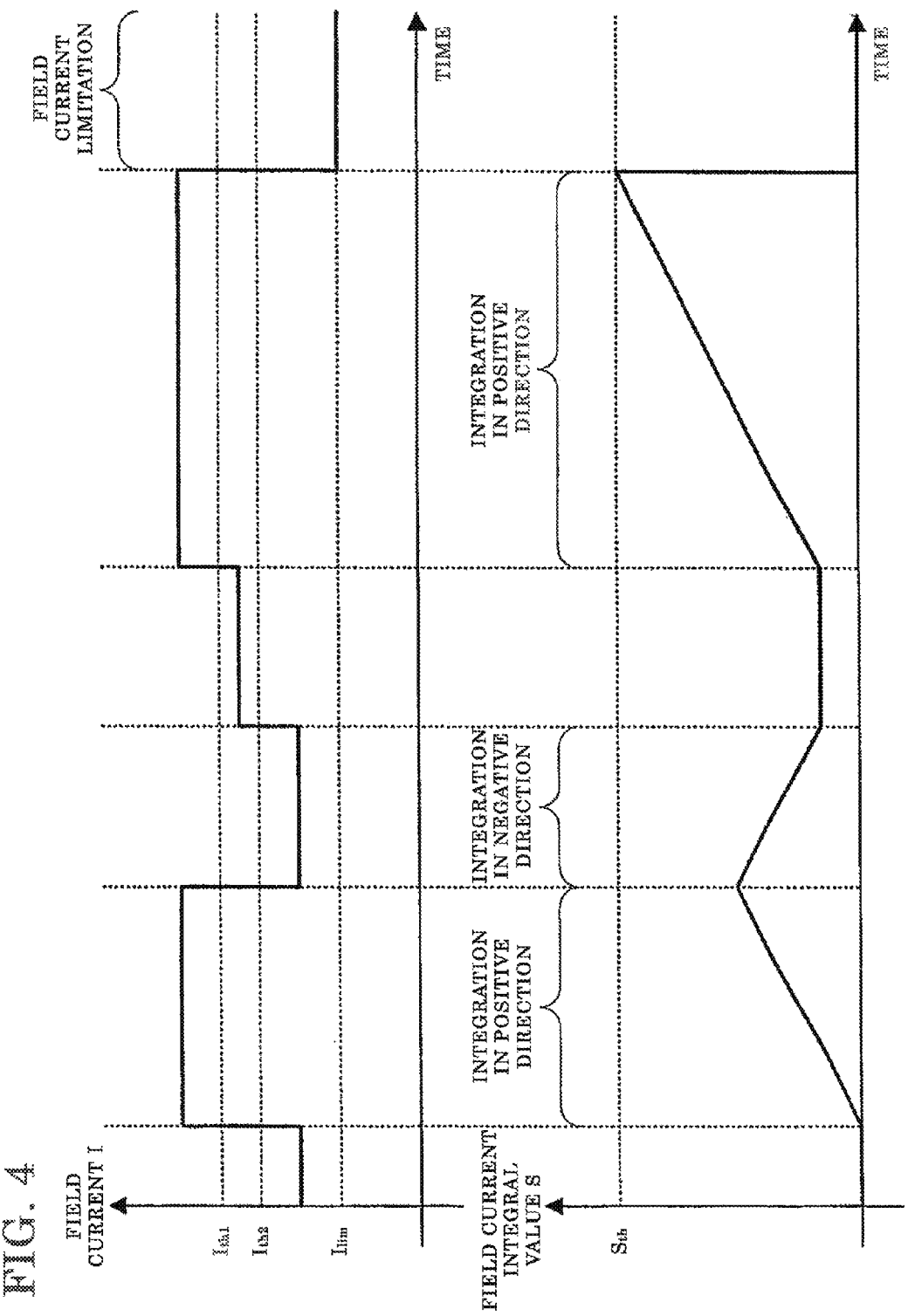
FIG. 4 is a time chart for explaining operation of the field current limiting section according to embodiment 1 of the present invention.

FIG. 4 is a time chart showing temporal changes in the field current and the field current integral value in the field current limiting section 140.

In the case of field current I>first field current threshold value $I_{th1}$, the field current limitation determining section 142 adds a difference $\Delta I_1$ between the field current I and the first field current threshold value $I_{th1}$ to the field current integral value S (integration in a positive direction).

On the other hand, in the case of field current I<second field current threshold value $I_{th2}$, the field current limitation determining section 142 subtracts a difference $\Delta I_2$ between the second field current threshold value $I_{th2}$ and the field current I from the field current integral value S (integration in a negative direction).

In the case of field current I≤first field current threshold value $I_{th1}$ and field current I≥second field current threshold value $I_{th2}$, the field current limitation determining section 142 keeps the field current integral value S at present.

When field current integral value S>field current integral threshold value $S_{th}$ is satisfied, the field current limitation determining section 142 determines that the field current I needs to be limited. Then, the field current limitation determining section 142 transmits the determination result to the field current limitation instructing section 143.

Next, operation of the field current limitation determining section 142 will be described with reference to FIG. 5.

Figure 5:
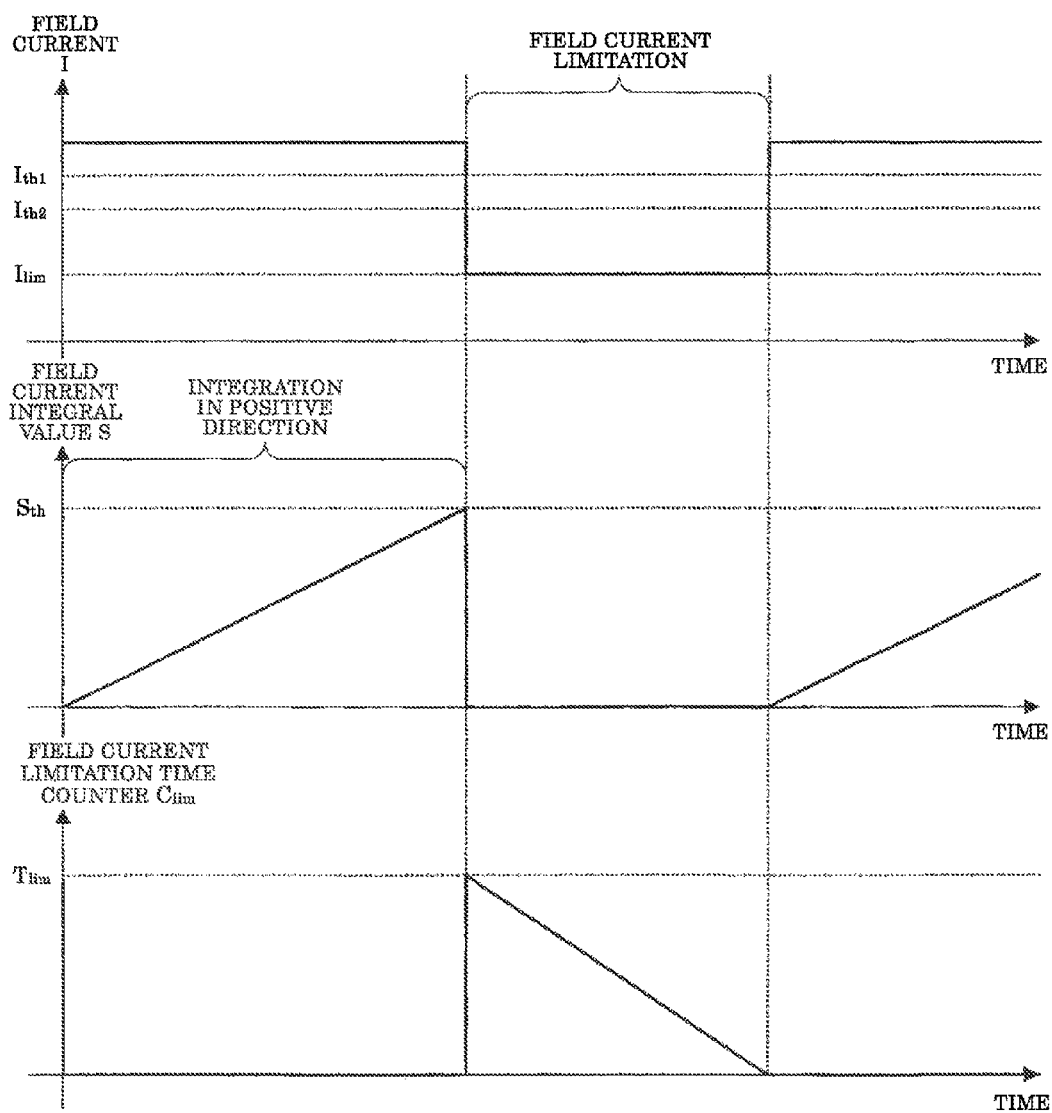
FIG. 5 is a time chart for explaining operation in the case where field current is limited by the field current limiting section according to embodiment 1 of the present invention.

FIG. 5 is a time chart showing temporal changes in the field current, the field current integral value, and a field current limitation time counter when the field current is limited in the field current limiting section 140.

Based on a result of determination by the field current limitation determining section 142, if it is determined that the field current I needs to be limited, the field current limitation instructing section 143 acquires the field current limitation value $I_{lim}$ from the field current limitation value storage section 141c and the field current limitation time $T_{lim}$ from the field current limitation time storage section 141d, and sets the field current limitation time $T_{lim}$ for the field current limitation time counter $C_{lim}$ (see expression below).

$$C_{lim}=T_{lim}$$

Then, the field current limitation instructing section 143 transmits the field current limitation value $I_{lim}$ to the field current control section 110 during the field current limitation time $T_{lim}$. Thus, the field current control section 110 that has received the field current limitation value $I_{lim}$ controls the field current I to be the field current limitation value $I_{lim}$ (in the case where field current instruction value $I_f$<field current limitation value $I_{lim}$ is satisfied, the field current instruction value $I_f$).

The second field current threshold value $I_{th2}$ is set such that the temperature of the field-winding rotating electrical machine 40 is kept within a normal range when the field-winding rotating electrical machine is continuously operating. In this case, the field current limitation value $I_{lim}$ is set to be equal to or smaller than the second field current threshold value $I_{th2}$. Thus, the temperature of the field-winding rotating electrical machine 40 can be more reliably reduced to a temperature at which a normal operation can be performed.

The field current limitation determining section 142 clears and sets the field current integral value S to 0 (zero) when the field current integral value S has exceeded the field current integral threshold value $S_{th}$.

At the time when the field current limitation time $T_{lim}$ has elapsed since limitation of the field current I has been started, the field current limitation instructing section 143 stops transmitting the field current limitation value $I_{lim}$ to the field current control section 110. That is, the limitation of the field current I is released, and the field current I is controlled based on the field current instruction value $I_f$.

Next, operation of the field current limitation releasing section 150 will be described with reference to FIG. 6.

Figure 6:
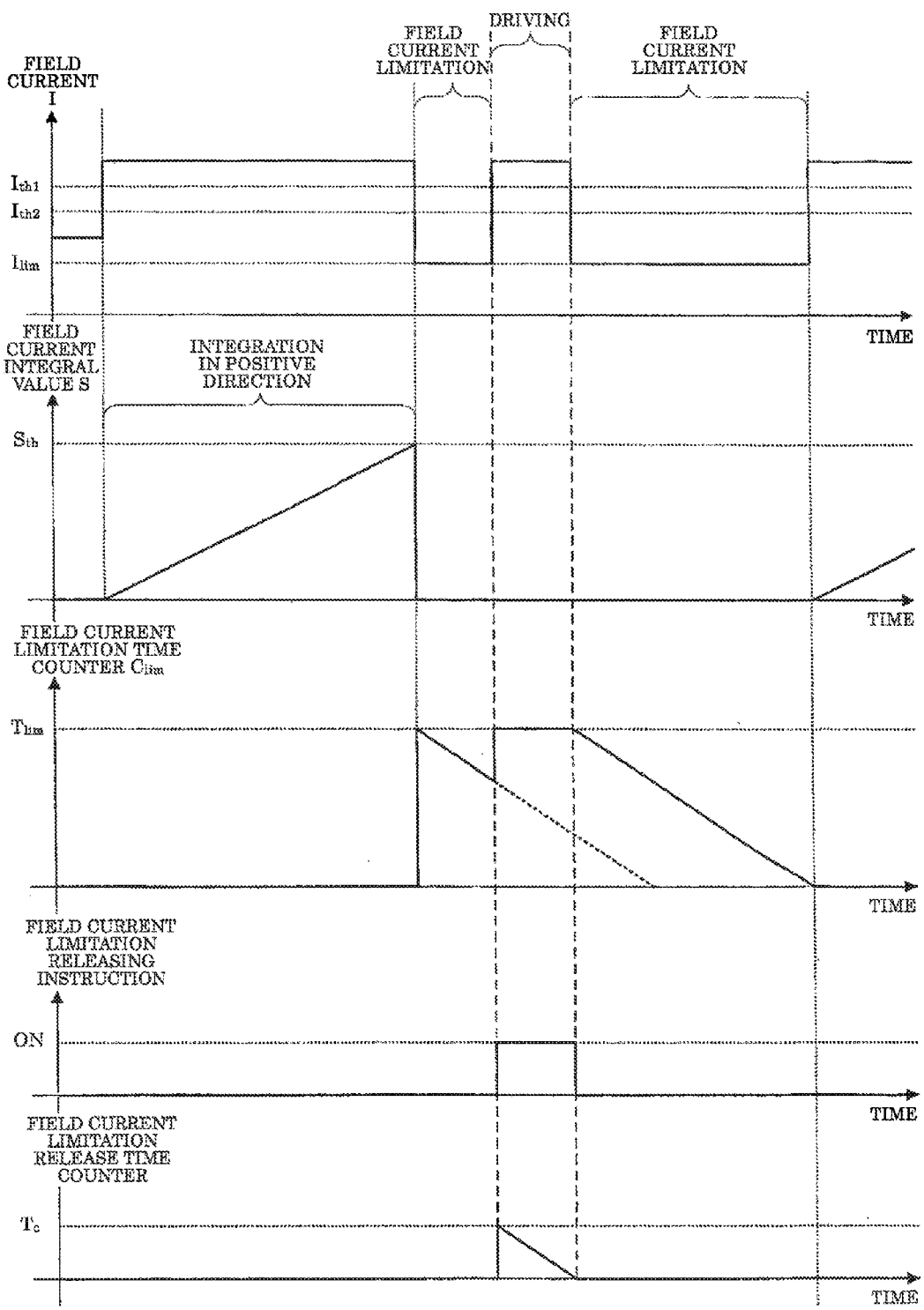
FIG. 6 is a time chart for explaining operation during field current limitation by the field current limiting section according to embodiment 1 of the present invention.

FIG. 6 is a time chart showing temporal changes in the field current, the field current integral value, the field current limitation time counter, and a field current limitation release time counter in the case where a field current limitation releasing instruction is received from the field current limitation releasing section 150 during field current limitation in the field current limiting section 140.

When the field current I is limited by operation of the field current limiting section 140, output in power generation and output in driving are both lower than those in the case of no limitation. Therefore, in the case where the field current I is limited when an engine is stopped in, for example, an idling stop state, original desired torque needed for starting the engine cannot be generated. Therefore, there is a possibility that the engine cannot be restarted, so that the behavior of a vehicle may be greatly influenced.

Considering the above, when the field current I is limited, in the case where the external instruction 160 is a driving instruction, the field current limitation releasing section 150 receives the value of the field current limitation time counter $C_{lim}$ from the field current limitation instructing section 143, reads the field current limitation release time $T_C$ corresponding to the received value, and then transmits a field current limitation releasing instruction to the field current limitation instructing section 143 during the field current limitation release time $T_C$ by the limitation release time measuring means 152a.

Then, when having received the field current limitation releasing instruction from the field current limitation releasing section 150, the field current limiting section 140 releases limitation of the field current I and performs control using a normal field current value. Thus, driving control or power generation control for the motor generator 50 can be performed in the same state as a normal state in which limitation is not performed.

However, immediately after limitation of the field current I is started, it is assumed that a time during which operation can be performed without limitation is shorter than, for example, a time needed for starting an engine, so that a driving operation is repeated unnecessarily. Considering this, in the case where a limitation elapsed time of the field current I is equal to or shorter than a predetermined time, that is, in a region in which a time during which limitation of the field current can be released is equal to or shorter than, for example, a time needed for starting the engine, the limitation of the field current may not be released (the field current limitation release time $T_C$ may be set to 0 (zero)).

Here, the field current limitation release time $T_C$ is changed in accordance with a time that has elapsed since the field current limiting section 140 has started limiting the field current I. However, for example, in such a case where the field current limitation time $T_{lim}$ in the field current limiting section 140 is variable in accordance with the value of the field current I that is being limited, the field current limitation release time $T_C$ may be set in accordance with the remaining time of the limitation of the field current I.

In the case where the external instruction 160 is power generation, since influence on the behavior of a vehicle is small, limitation of the field current may be prioritized and a field current limitation releasing instruction may not be transmitted in order to prevent a time of limitation from being prolonged more than necessary, or a field current limitation releasing instruction may be transmitted during the field current limitation release time $T_C$ as in the case of driving.

As described above, the field-winding rotating electrical machine according to the present invention includes: the motor generator 50 having the field winding 52; the field current detecting section 120 for detecting the field current I flowing in the field winding 52; the field current control section 110 for controlling the field current; the field current limiting section 140 including the field current limitation determining section 142 for calculating a determination value based on the field current I detected by the field current detecting section 120 and determining whether or not the determination value has reached a predetermined determination threshold value, and the field current limitation instructing section 143 for, when the field current limitation determining section 142 determines that the determination value has reached the predetermined determination threshold value, generating a field current limiting instruction to the field current control section 110 so as to limit the field current I to be equal to or smaller than a predetermined permissible value during a predetermined field current limitation time $T_{lim}$; and the field current limitation releasing section 150 for outputting a field current limitation releasing instruction to the field current limiting section 140 so as to release limitation of the field current I during a predetermined field current limitation release time $T_C$. When having received the field current limitation releasing instruction from the field current limitation releasing section 150, the field current limiting section 140 releases limitation of the field current I during the predetermined field current limitation release time $T_C$. The above configuration provides a significant effect of realizing a field-winding rotating electrical machine in which, in the case where, based on a result of detection of field current flowing in the field winding, the field current is limited so that the temperature of the field-winding rotating electrical machine does not excessively increase, if it is determined that the limitation of the field current needs to be released based on an external instruction, the limitation is released during a predetermined time, whereby an influence on a vehicle can be minimized.

It is noted that, within the scope of the present invention, the above embodiments may be freely combined with each other, or each of the above embodiments may be modified or abbreviated as appropriate.

DESCRIPTION OF THE REFERENCE CHARACTERS 30 storage battery
40 field-winding rotating electrical machine
50 motor generator
52 field winding
53 current detector
60 power conversion section
70 control section
110 field current control section
120 field current detecting section
130 field current instructing section
140 field current limiting section
141 storage section
142 field current limitation determining section
143 field current limitation instructing section
150 field current limitation releasing section
151 field current limitation release time storage section
152 field current limitation release instructing section
160 external instruction

The invention claimed is:
1. A field-winding rotating electrical machine comprising:
a motor generator having a field winding;
a field current detecting section for detecting field current flowing in the field winding;
a field current control section for controlling the field current;
a field current limiting section including a field current limitation determining section for calculating a determination value based on the field current detected by the field current detecting section and determining whether or not the determination value has reached a predetermined determination threshold value, and a field current limitation instructing section for, in response to the field current limitation determining section determining that the determination value has reached the predetermined determination threshold value, generating a field current limiting instruction and transmitting the field current limiting instruction to the field current control section so as to limit the field current to be equal to or smaller than a predetermined permissible value during a predetermined field current limitation time; and a field current limitation releasing section for outputting a field current limitation releasing instruction to the field current limiting section, the field current limitation releasing instruction comprising an explicit instruction to release limitation of the field current during a predetermined field current limitation release time that is a time period falling within the predetermined field current limitation time, wherein the field current limiting section, in response to having received the field current limitation releasing instruction from the field current limitation releasing section, releases limitation of the field current during the predetermined field current limitation release time and resumes limiting of the field current in response to expiration of the predetermined field current limitation release time.

2. The field-winding rotating electrical machine according to claim 1, wherein the field current limitation releasing section changes the predetermined field current limitation release time in accordance with a time that has elapsed since the field current limiting section has started limiting the field current.

3. The field-winding rotating electrical machine according to claim 1, wherein
the motor generator has at least one operation mode which is shifted in accordance with an operation instruction from outside, and
the field current limitation releasing section instructs the field current limiting section to release limitation of the field current during the predetermined field current limitation release time only in response to the operation instruction indicating a predetermined operation mode.

4. The field-winding rotating electrical machine according to claim 3, wherein the predetermined operation mode is a driving operation mode for the motor generator.

5. The field-winding rotating electrical machine according to claim 1, wherein if the predetermined field current limitation time is equal to or shorter than a predetermined time, the field current limitation releasing section sets the predetermined field current limitation release time to zero.

6. The field-winding rotating electrical machine according to claim 1, wherein the field current limiting section is configured such that the predetermined field current limitation time is variable in accordance with a value of the field current that is being limited.

* * * * *